US006828696B2

(12) United States Patent
Barry et al.

(10) Patent No.: US 6,828,696 B2

(45) Date of Patent: Dec. 7, 2004

(54) APPARATUS AND METHOD FOR POWERING MULTIPLE MAGNETRONS USING A SINGLE POWER SUPPLY

(75) Inventors: Jonathan D. Barry, Frederick, MD (US); Ta Hai Yoh, Alexandria, VA (US); Moossa Joseph Arman, Germantown, MD (US)

(73) Assignee: Fusion UV Systems, Inc., Gaithersburg, MD (US)

(*) Notice: Subject to any disclaimer, the term of this patent is extended or adjusted under 35 U.S.C. 154(b) by 0 days.

(21) Appl. No.: 10/284,404

(22) Filed: Oct. 31, 2002

(65) Prior Publication Data

US 2004/0004401 A1 Jan. 8, 2004

Related U.S. Application Data

(60) Provisional application No. 60/393,128, filed on Jul. 3, 2002.

(51) Int. Cl.[7] .................................................. H02J 1/00

(52) U.S. Cl. ............................ 307/33; 307/31; 307/34; 307/32; 219/678; 219/702

(58) Field of Search ............................ 307/31, 33, 34, 307/32; 219/678, 702

(56) References Cited

U.S. PATENT DOCUMENTS

| | | | |
|---|---|---|---|
| 2,543,887 A | | 3/1951 | Brown et al. |
| 2,605,383 A | | 7/1952 | Spencer |
| 2,609,497 A | | 9/1952 | Dawson et al. |
| 3,104,303 A | | 9/1963 | Crapuchettes |
| 3,104,305 A | | 9/1963 | Crapuchettes |
| 3,619,536 A | | 11/1971 | Boehm |
| 4,001,536 A | | 1/1977 | Eberhardt, Jr. |
| 4,294,858 A | | 10/1981 | Moule |
| 4,348,572 A | | 9/1982 | Moule |
| 4,868,509 A | | 9/1989 | Ury et al. |
| 4,939,330 A | | 7/1990 | Berggren et al. |
| 4,939,331 A | | 7/1990 | Berggren et al. |
| 4,980,610 A | | 12/1990 | Varga |
| 5,180,895 A | | 1/1993 | Briggs et al. |
| 5,338,422 A | | 8/1994 | Belkind et al. |
| 5,451,751 A | | 9/1995 | Takimoto et al. |
| 5,571,439 A | | 11/1996 | Daley et al. |
| 5,777,863 A | | 7/1998 | Kowalevskii et al. |
| 5,818,014 A | | 10/1998 | Smith et al. |
| 6,084,760 A | | 7/2000 | Nomura |
| 6,509,656 B2 | * | 1/2003 | Penzenstadler et al. |

FOREIGN PATENT DOCUMENTS

| | | |
|---|---|---|
| DE | 42 38 198 | 5/1994 |
| DE | 42 38 199 | 5/1994 |
| JP | 6-188085 | 7/1994 |

* cited by examiner

*Primary Examiner*—Robert L DeBeradinis

(74) *Attorney, Agent, or Firm*—Antonelli, Terry, Stout & Kraus, LLP

(57) ABSTRACT

A system and method are provided to power a plurality of magnetrons devices. The system may include a power supply device to power a first magnetron device, a second magnetron device and a third magnetron device. A control device may control (or apportion) an amount of current to each of the second and third magnetron devices.

23 Claims, 3 Drawing Sheets

APPARATUS AND METHOD FOR POWERING MULTIPLE MAGNETRONS USING A SINGLE POWER SUPPLY

This application claims priority under 35 U.S.C. §119(e) from U.S. Provisional Application No. 60/393,128, filed Jul. 3, 2002, the subject matter of which is incorporated herein by reference.

This application is related to U.S. patent application Ser. No. 09/852,015, filed May 10, 2001, the subject matter of which is incorporated herein by reference.

FIELD OF THE INVENTION

The present invention relates to utilizing and/or controlling a plurality of magnetrons that are powered by a single power supply.

DESCRIPTION OF RELATED ART

Microwave heating is a technique that can be applied with great advantage in a multiple of processes which include the supply of thermal energy. One advantage is that the heating power can be controlled in the absence of any inertia.

One drawback, however, is that microwave equipment is often more expensive than conventional alternatives. A magnetron of such heating equipment may be driven by a power unit with associated control system, which constitute the major cost of the equipment. Since the output power of the magnetron is limited, heating equipment may require the presence of a significant number of magnetrons and associated power units and control systems to achieve a given heating requirement.

Magnetrons may be used to generate radio frequency (RF) energy. This RF energy may be used for different purposes such as heating items (i.e., microwave heating) or it may be used to generate a plasma. The plasma, in turn, may be used in many different processes, such as thin film deposition, diamond deposition and semiconductor fabrication processes. The RF energy may also be used to create a plasma inside a quartz envelope that generates UV (or visible) light. Those properties decisive in this regard are the high efficiency achieved in converting d.c. power to RF energy and the geometry of the magnetron. One drawback is that the voltage required to produce a given power output varies from magnetron to magnetron. This voltage may be determined predominantly by the internal geometry of the magnetron and the magnetic field strength in the cavity.

Some applications may require two or more magnetrons to provide the required RF energy. In these situations, an individual power source has been required for each magnetron. Two or more magnetrons may be coupled to a power supply in parallel. However, two magnetrons of identical design may not have identical voltage versus current characteristics. Normal manufacturing tolerance and temperature differences between two identical magnetrons may yield different voltage versus current characteristics. As such, each magnetron may have a slightly different voltage. For example, the magnetrons may have mutually different operating curves such that one magnetron may produce a higher power output than the other magnetron. The magnetron having the higher output power may become hotter than the other, wherewith the operating curve falls and the power supply will be clamped or limited to a lower output voltage. This may cause the power output of the magnetron producing the higher output to fall further until only one magnetron produces all the power due to the failure to reach the knee voltage of the other magnetron. It is desirable to utilize a plurality of magnetrons without these problems.

SUMMARY OF THE INVENTION

Embodiments of the present invention may provide a system that includes a power supply device to supply a current, at least three magnetron devices to be powered by the power supply device, and a control circuit to apportion an amount of current to each of the plurality of magnetron devices.

The control circuit may include a first hall effect sensor coupled between the power supply device and a first one of the magnetron devices, a second hall effect sensor coupled between the power supply device and a second one of the magnetron devices, and a third hall effect sensor coupled between the power supply device and a third one of the magnetron devices.

The third magnetron device may be a master magnetron device, the second magnetron device may be a slave magnetron device, and the third magnetron device may be a slave magnetron device.

The first hall effect sensor may sense current in the first magnetron device, the second hall effect sensor may sense current in the second magnetron device, and the third hall effect sensor may sense current in the third magnetron device. The control circuit may further include a first compare device to compare an output of the first hall effect sensor and an output of the second hall effect sensor. The control circuit may further include a second compare device to compare an output of said first hall effect sensor and an output of said third hall effect sensor.

Embodiments of the present invention may further include a system that includes a power supply device, a first magnetron device and a second magnetron device each to be powered by the power supply device. A first sensor device may sense current through the first magnetron device and a second sensor device may sense current through the second magnetron device. A first compare device may compare an output of the first sensor device and an output of the second sensor device. A first mechanism may adjust current to the second magnetron device based on the comparison of the first compare device. The system may further include a third magnetron device to be powered by the power supply device, a third sensor device to sense current through the third magnetron device. A second compare device may compare an output of the first sensor device and an output of the third sensor device. A second mechanism may adjust current to the third magnetron device based on the comparison of the second compare device.

Embodiments of the present invention may further provide a method of powering at least three magnetrons. The method may include providing a first current along a first signal line to a first magnetron device, providing a second current along a second signal line to a second magnetron device, and providing a third current along a third signal line to a third magnetron device. Current may be apportioned to each of the first, second and third magnetron devices.

Other objects, advantages and salient features of the invention will become apparent from the detailed description taken in conjunction with the annexed drawings, which disclose preferred embodiments of the invention.

BRIEF DESCRIPTION OF THE DRAWINGS

Arrangements and embodiments of the present invention will be described with reference to the following drawings in which like reference numerals refer to like elements and wherein.

DETAILED DESCRIPTION OF PREFERRED EMBODIMENTS

Arrangements and embodiments of the present invention may provide a system incorporating a solid state power supply and control apparatus to operate two or more magnetrons. In particular, embodiments of the present invention may allow two or more magnetrons to be powered by a single (i.e., common) power supply. Arrangements for powering multiple magnetrons by a single power supply have been described in U.S. patent application Ser. No. 09/852,015, filed May 10, 2001, the subject matter of which is incorporated herein by reference.

Figure 1:
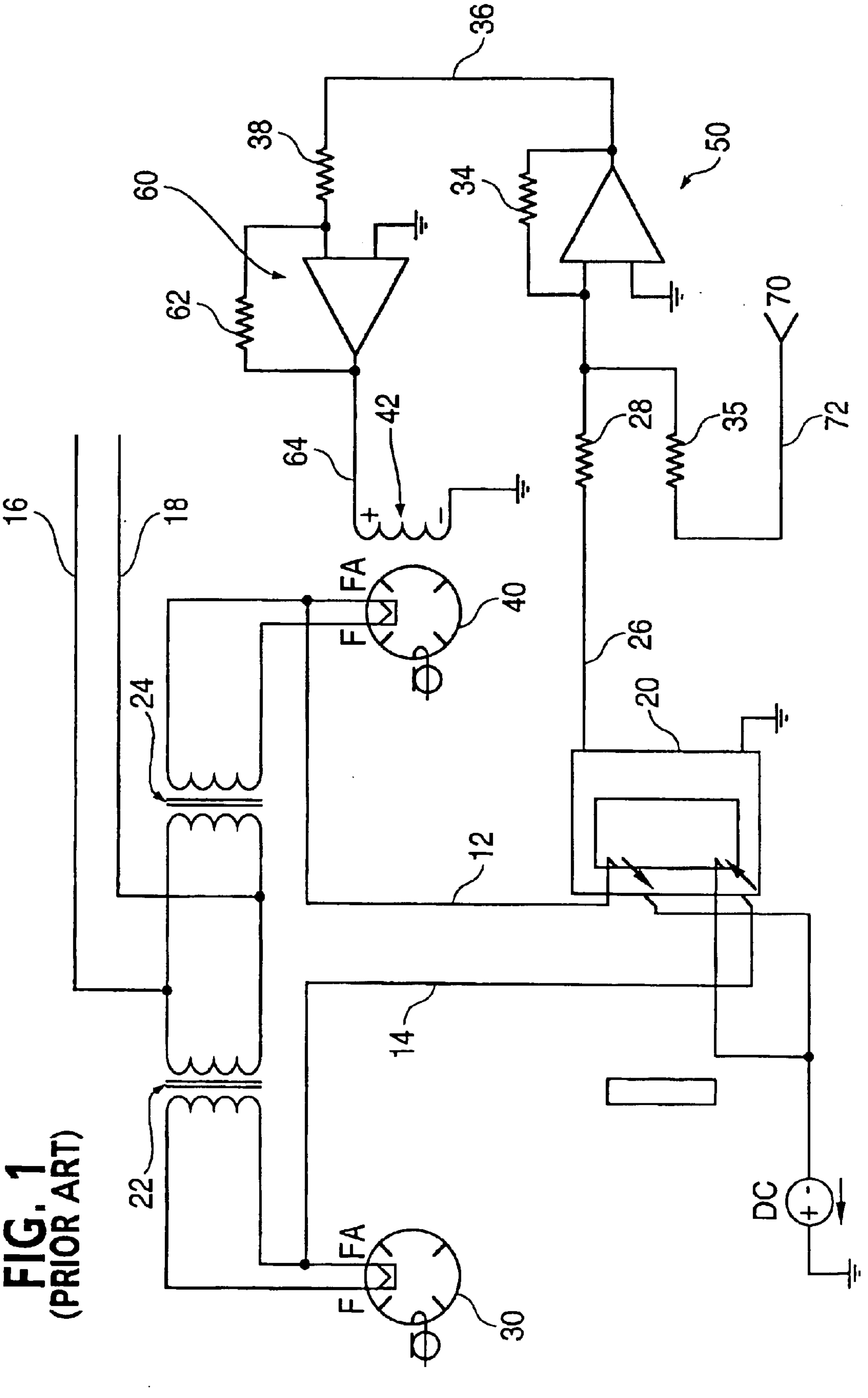
FIG. 1 (PRIOR ART)
FIG. 1 is a circuit diagram of an example arrangement.

FIG. 1 is a circuit diagram for powering two magnetrons (or two magnetron devices) from a single power supply according to an example arrangement. Other arrangements and configurations are also possible. In particular, FIG. 1 shows a power supply 10 such as a high-voltage low ripple d.c. power supply. More specifically, the power supply 10 may include a solid state high voltage power supply capable of 1.68 amp output at 4.6 KV. The power supply 10 may be designed to provide a constant current output (or approximately constant current). Other amounts of current and power are also possible. The power supply 10 may be coupled to a hall effect current transformer 20 such that a first signal line 12 wraps around the hall effect current transformer 20 in a first direction (i.e., clockwise) and a second signal line 14 wraps around the hall effect current transformer 20 in a second direction (i.e., counterclockwise) opposite to the first direction. As will be described below, the hall effect current transformer 20 acts to sense the current through the lines 12 and 14 and adjust the current to one of the magnetrons such that both magnetrons have equal current (or substantially equal current). The hall effect current transformer 20 thereby apportions an amount of current to both magnetrons. Stated differently, the power supply 10 supplies a constant current output that is sensed by the hall effect current transformer 20. As is known in the art, a hall effect current sensor (such as the hall effect current transformer 20) utilizes the Hall effect to sense the magnetic field and output a proportional voltage. The output of the hall effect current transformer 20 is proportional to the difference in current between lines 12 and 14.

The signal line 12 may be coupled to the cathode of a magnetron 40 and the signal line 14 may be further coupled to the cathode of a magnetron 30 as shown in FIG. 1. In this arrangement, the filaments are coupled to a transformer that provides the necessary current for filament heating. The primaries of filament transformers 22 and 24 may be powered from an AC source (such as 100 to 200 volts) across the signal lines 16 and 18. The cathode terminal may also be shared with one of the filament terminals. This may be specific to this arrangement as other arrangements may have similar or different connections.

In the FIG. 1 arrangement, a feedback loop may be utilized to adjust the current (or apportion the current) in the magnetron 40. More specifically, the hall effect current transformer 20 may be coupled by signal line 26 to a resistor 28 and to an error amplifier 50, which may include a resistor 34 coupled between its input and output. The output of the error amplifier 50 may be coupled along a signal line 36 to a resistor 38, which in turn may be coupled to an input of a coil driver 60, which may include a resistor 62 coupled between its input and output. The configuration and operation of the error amplifier 50, the coil driver 60 and the resistors 28, 34 and 38 are merely one example of providing these respective functions. Other combinations and configurations of resistors and amplifiers are also possible. The output of the coil driver 60 may be applied along a signal line 64 to a start terminal of an electromagnet 42 associated with the magnetron 40. A finish terminal of the electromagnet 42 may be coupled to ground as shown in FIG. 1.

A modulation input 70 may be applied along signal line 72 and through a resistor 35 to an input of the error amplifier 50. The input 70 allows the current (power) distribution between the magnetrons to be a time varying function. This simulates the magnetrons being operated from a conventional rectified unfiltered power supply. Some types of ultraviolet (UV) bulbs may benefit from this type of operation.

Figure 2:
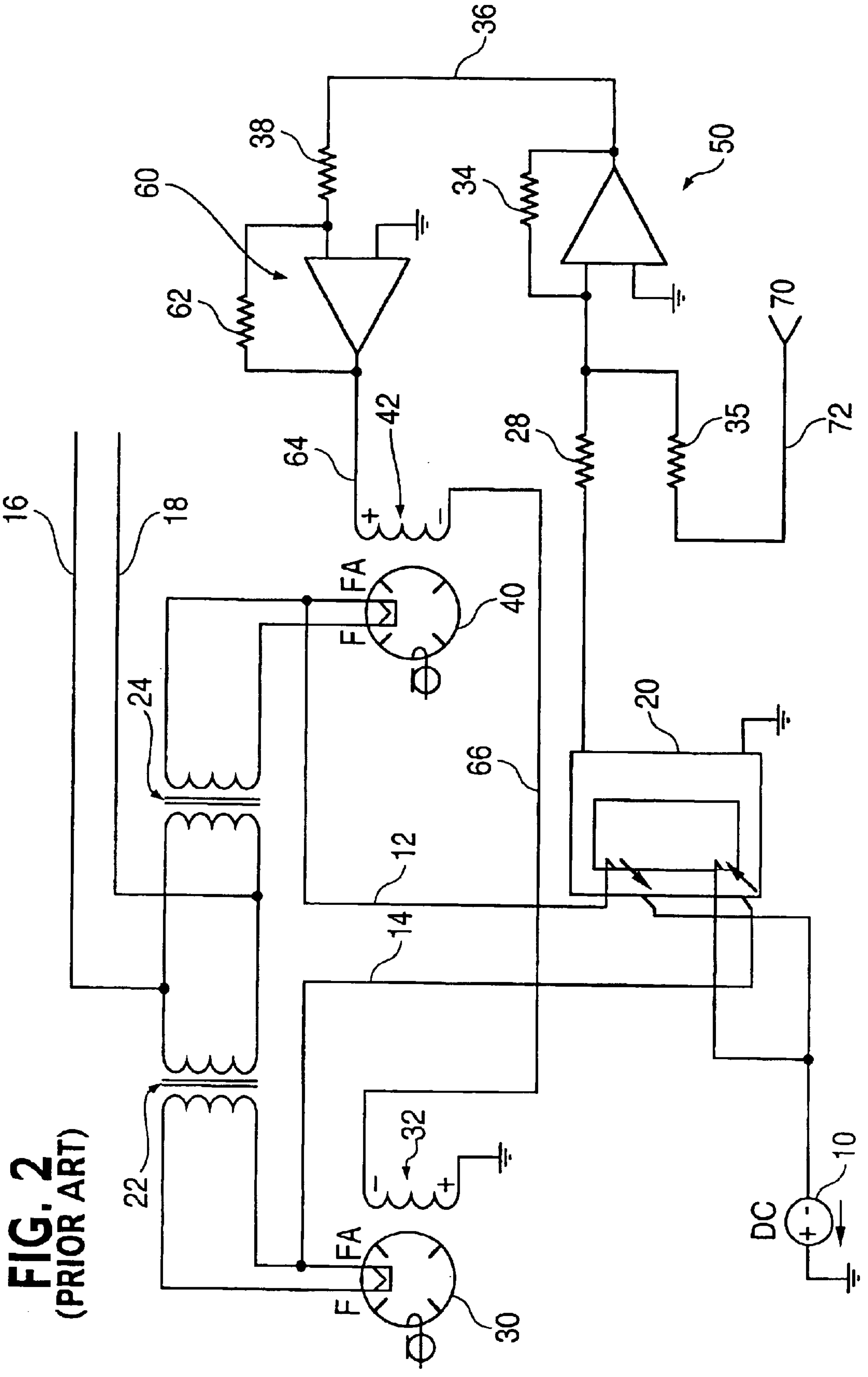
FIG. 2 (PRIOR ART)
FIG. 2 is a circuit diagram of another example arrangement.

FIG. 2 is a circuit diagram of another example arrangement that utilizes a single power supply 10 and two magnetrons 30 and 40. Other arrangements and configurations are also possible. This arrangement is similar to the FIG. 1 arrangement and additionally includes a signal line 66 that couples the finish terminal of the electromagnet 42 to a finish terminal of an electromagnet 32 associated with the magnetron 30. A start terminal of the electromagnet 32 may be coupled to ground as shown in FIG. 2. This type of connection provides an increasing magnetic field in the magnetron 40 and a decreasing magnetic field in the magnetron 30 for a given current direction. In this arrangement, the feedback may be utilized to adjust the current in the magnetrons 30 and 40.

The power supply 10 may be designed to provide a constant current where the output current will be shared by the two magnetrons 30 and 40. Sharing of the current may be made possible by utilizing the hall effect current transformer 20. The hall effect current transformer 20 may sense current in the lines 12 and 14 and operate to monitor the anode current to each of the magnetrons 30 and 40 and adjust the electromagnet current such that both the magnetrons 30 and 40 have equal currents. This may be accomplished by having the output of the hall effect current transformer 20 be forced to zero by using the feedback loop described above that includes the error amplifier 50 and the coil driver 60. The circuit may provide current mirroring for the magnetrons 30 and 40. Additionally, the use of the electromagnet 42 and the electromagnet 32 in the FIG. 2 arrangement allows the magnetic flux to be increased in one of the magnetrons while the magnetic flux is decreased in the other magnetron.

In summary, arrangements may provide a system having a single power supply device that supplies power to at least two magnetrons. This may be accomplished by sensing the current applied to the anode of each magnetron 30 and 40 using a hall effect current transformer 20 as shown in the figures. This scheme may be adapted to a system or process having more than one magnetron.

As discussed above, arrangements may include an electromagnet coil associated with one of the two magnetrons. In the FIG. 2 arrangement, the electromagnet coil is on each magnetron and the coils are driven in series. In the FIG. 1 arrangement, current through the magnetron having the coil may be adjusted to a desired amount and the remainder of the available current may flow through the magnetron without the coil. Stated differently, the current from the power supply may be apportioned between the two magnetrons. For example, current through the second magnetron may be adjusted to be equal to the current through the coil-less magnetron.

Embodiments of the present invention may be applicable to more than two magnetrons. For example, one magnetron may be coil-less whereas the other two magnetrons (or more than two magnetrons) may each have an electromagnetic coil. The coil-less magnetron may be called a master magnetron and the coiled magnetrons may be called slave magnetrons. In the slave magnetrons, the current may be adjusted relative to the master magnetron.

Figure 3:
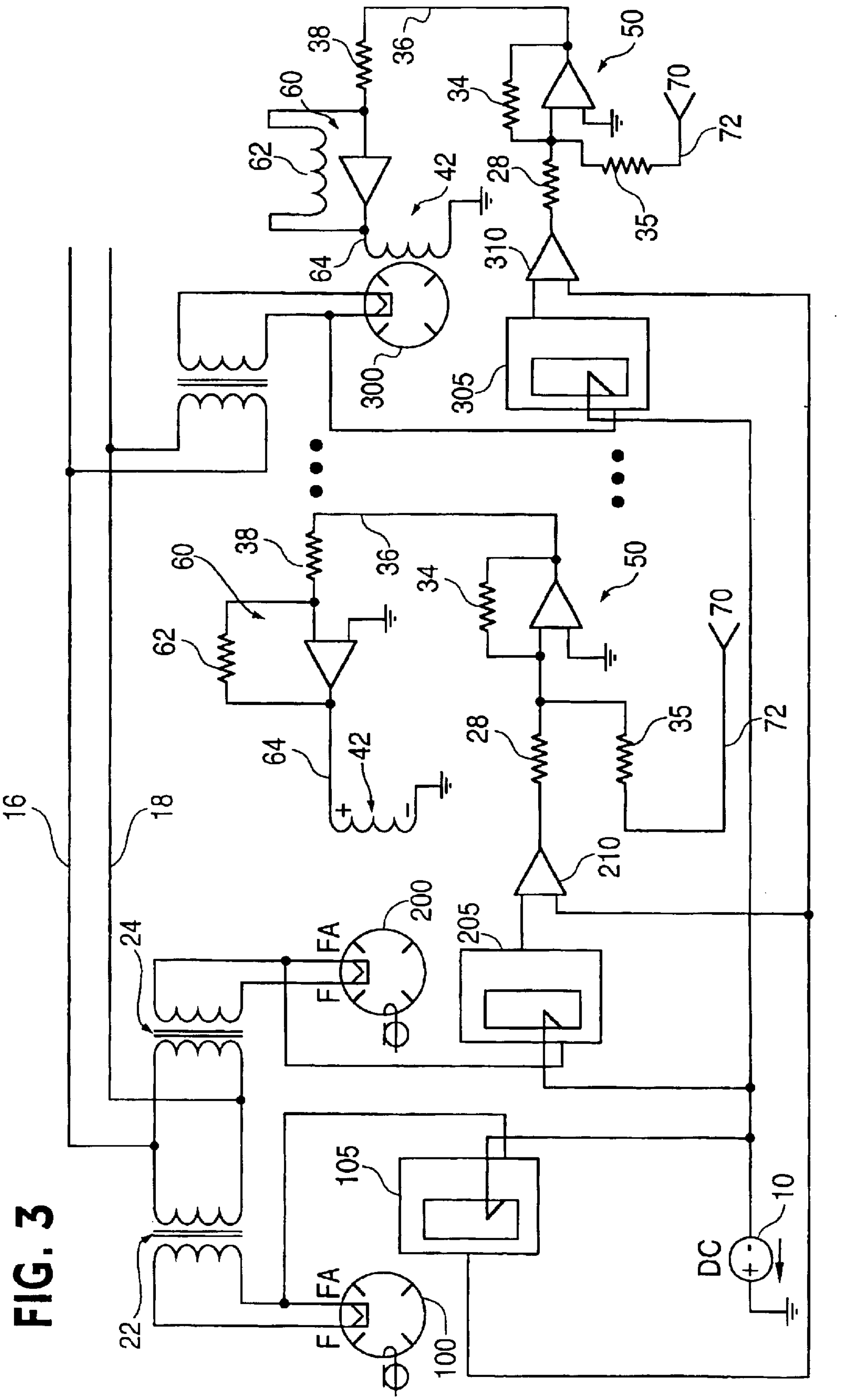
FIG. 3 is a circuit diagram of an example embodiment of the present invention.

FIG. 3 is a circuit diagram according to an example embodiment of the present invention. The circuit operates to adjust the current (or apportion the current) in the slave magnetrons relative to the master magnetron. Other embodiments and configurations are also within the scope of the present invention. For example, while FIG. 3 only shows three magnetrons, other numbers of magnetrons are also within the scope of the present invention.

FIG. 3 shows a master magnetron 100 and two slave magnetrons 200 and 300. As shown, a hall effect sensor 105 (also called a hall effect current transformer) may be coupled between the power supply 10 and the master magnetron 100. Additionally, a hall effect sensor 205 may be coupled between the power supply 10 and the slave magnetron 200, and a hall effect sensor 305 may be coupled between the power supply 10 and the slave magnetron 300. The current sensing devices (such as the hall effect sensors) may sense the current in each of the magnetrons with opposing polarity such that when the magnetron currents are equal, the hall effect sensor output is approximately zero.

Embodiments of the present invention may use individual current sensors (such as the hall effect sensors 105, 205 and 305) and compare their outputs by use of compare devices. For example, FIG. 3 shows a compare device 210 to compare an output of the hall effect sensor 105 (coupled to the master magnetron 100) and the hall effect sensor 205 (coupled to the slave magnetron 200). FIG. 3 also shows a compare device 310 to compare an output of the hall effect sensor 105 (coupled to the master magnetron 100) and the hall effect sensor 305 (coupled to the slave magnetron 300). The use of two hall effect sensors and a compare device may also be applicable to two magnetrons being powered by a single power supply. That is, the earlier described arrangements may be modified in a manner similar to FIG. 3 to include two hall effect sensors and a compare device.

The compare device 210 may output signals to a first feedback loop of the slave magnetron 200 that adjusts the current to the slave magnetron 200. Similarly, the compare device 310 may output signals to a second feedback loop of the slave magnetron 300 that adjusts the current to the slave magnetron 300.

The first feedback loop of the slave magnetron 200 may be similar to the feedback loop discussed above with respect to FIG. 1. For example, the compare device 210 may be coupled by signal line 226 to a resistor 228 and to an error amplifier 250, which may include a resistor 234 coupled between its input and output. The output of the error amplifier 250 may be coupled along a signal line 236 to a resistor 238, which in turn may be coupled to an input of a coil driver 260, which may include a resistor 262 coupled between its input and output. The configuration and operation of the error amplifier 250, the coil driver 260 and the resistors 228, 234 and 238 are merely one example of providing these respective functions. Other combinations and configurations of resistors and amplifiers are also possible. The output of the coil driver 260 may be applied along a signal line 264 to a start terminal of an electromagnet 242 associated with the magnetron 200. A finish terminal of the electromagnet 242 may be coupled to ground as shown in FIG. 3. A modulation input 270 may be applied along signal line 272 and through a resistor 235 to an input of the error amplifier 250. The input 270 allows the current (power) distribution between the magnetrons to be a time varying function.

The second feedback loop of the slave magnetron 300 may also be similar to the feedback loop discussed above with respect to FIG. 1. For example, the compare device 310 may be coupled by signal line 326 to a resistor 328 and to an error amplifier 350, which may include a resistor 334 coupled between its input and output. The output of the error amplifier 350 may be coupled along a signal line 336 to a resistor 338, which in turn may be coupled to an input of a coil driver 360, which may include a resistor 362 coupled between its input and output. The configuration and operation of the error amplifier 350, the coil driver 360 and the resistors 328, 334 and 338 are merely one example of providing these respective functions. Other combinations and configurations of resistors and amplifiers are also possible. The output of the coil driver 360 may be applied along a signal line 364 to a start terminal of an electromagnet 342 associated with the magnetron 300. A finish terminal of the electromagnet 342 may be coupled to ground as shown in FIG. 3. A modulation input 370 may be applied along signal line 372 and through a resistor 335 to an input of the error amplifier 350. The input 370 allows the current (power) distribution between the magnetrons to be a time varying function.

While FIG. 3 shows a first feedback loop and a second feedback loop, other types of feedback loops are also within the scope of the present invention. Additionally, the compare device 210 may be considered part of the first feedback loop and the compare device 310 may be considered part of the second feedback loop. Further, if more than two slave magnetrons are provided, then an additional compare device and feedback loop may also be provided in a manner corresponding to that of the slave magnetrons 200 and 300.

While the invention has been described with reference to specific embodiments, the description of the specific embodiments is illustrative only and is not to be considered as limiting the scope of the invention. That is, various other modifications and changes may occur to those skilled in the art without departing from the spirit and the scope of the invention.

What is claimed:

1. A system comprising:

a power supply device to supply a current;

at least three magnetron devices to be powered by the power supply device; and a control circuit to apportion an amount of current to each of said three magnetron devices.

2. The system of claim 1, wherein said control circuit controls an amount of current reaching a first one of said magnetron devices and an amount of current reaching a second one of said magnetron devices.

3. The system of claim 1, wherein said power supply device supplies an approximately constant current.

4. The system of claim 1, wherein said control circuit comprises a first hall effect sensor coupled between said power supply device and a first one of said magnetron devices, a second hall effect sensor coupled between said power supply device and a second one of said magnetron devices, and a third hall effect sensor coupled between said power supply device and a third one of said magnetron devices.

5. The system of claim 4, wherein said first one of said magnetron devices comprises a master magnetron device, said second one of said magnetron devices comprises a slave magnetron device, and said third one of said magnetron devices comprises a slave magnetron device.

6. The system of claim 4, wherein said first hall effect sensor senses current in said first one of said magnetron devices, said second hall effect sensor senses current in said second one of said magnetron devices, and said third hall effect sensor senses current in said third one of said magnetron devices.

7. The system of claim 6, wherein said control circuit further comprises a first compare device to compare an output of said first hall effect sensor and an output of said second hall effect sensor.

8. The system of claim 7, wherein said control circuit further comprises a second compare device to compare an output of said first hall effect sensor and an output of said third hall effect sensor device.

9. A system comprising:

a power supply device to power at least three magnetron devices; and control means for apportioning an amount of current to each of said at least three magnetron devices.

10. The system of claim 9, wherein said control means controls an amount of current reaching a first one of said magnetron devices and an amount of current reaching a second one of said magnetron devices.

11. The system of claim 9, wherein said power supply device supplies an approximately constant current.

12. The system of claim 9, wherein said control means comprises a first hall effect sensor coupled between said power supply device and a first one of said magnetron devices, a second hall effect sensor coupled between said power supply device and a second one of said magnetron devices, and a third hall effect sensor coupled between said power supply device and a third one of said magnetron devices.

13. The system of claim 12, wherein said first one of said magnetron devices comprises a master magnetron device, said second one of said magnetron devices comprises a slave magnetron device, and said third one of said magnetron devices comprises a slave magnetron device.

14. The system of claim 12, wherein said first hall effect sensor senses current in said first one of said magnetron devices, said second hall effect sensor senses current in said second one of said magnetron devices, and said third hall effect sensor senses current in said third one of said magnetron devices.

15. The system of claim 14, wherein said control means further comprises a first compare device to compare an output of said first hall effect sensor and an output of said second hall effect sensor.

16. The system of claim 15, wherein said control means further comprises a second compare device to compare an output of said first hall effect sensor and an output of said third hall effect sensor.

17. A system comprising:

a power supply device;

a first magnetron device and a second magnetron device each to be powered by the power supply device;

a first sensor device to sense current through said first magnetron device;

a second sensor device to sense current through the second magnetron device;

a first compare device to compare an output of said first sensor device and an output of said second sensor device; and a first mechanism to adjust current to said second magnetron device based on the comparison of said first compare device.

18. The system of claim 17, further comprising:

a third magnetron device to be powered by the power supply device;

a third sensor device to sense current through said third magnetron device;

a second compare device to compare an output of said third sensor device and an output of said first sensor device; and a second mechanism to adjust current to said third magnetron device based on the comparison of said second compare device.

19. A method of powering at least three magnetron devices, said method comprising:

providing a first current along a first signal line to a first magnetron device;

providing a second current along a second signal line to a second magnetron device;

providing a third current along a third signal line to a third magnetron device; and apportioning an amount of current to each of said second and third magnetron devices.

20. The method of claim 19, wherein said apportioning comprises sensing said first current, sensing said second current and sensing said third current, and adjusting said second current to said second magnetron device and adjusting said third current to said third magnetron device.

21. The method of claim 20, wherein said apportioning further comprises comparing said sensed first current and said sensed second current.

22. The method of claim 21, wherein said apportioning further comprises comparing said sensed first current and said sensed third current.

23. A method comprising:

powering a first magnetron device;

powering a second magnetron device;

sensing current through said first magnetron device;

sensing current through said second magnetron device;

comparing said sensed current through said first magnetron device and said sensed current through said second magnetron device;

adjusting current to said second magnetron device based on the comparison of the sensed current through said first magnetron device and said sensed current through said second magnetron device;

powering a third magnetron device;

sensing current through the third magnetron device;

comparing the sensed current through the first magnetron device and the sensed current through the third magnetron device; and adjusting current to the third magnetron device based on the comparison of the sensed current through the first magnetron device and the sensed current through the third magnetron device.

* * * * *